United States Patent
Dehm

(10) Patent No.: US 10,625,610 B2
(45) Date of Patent: Apr. 21, 2020

(54) CHARGING DEVICE FOR A MOTOR VEHICLE, MOTOR VEHICLE, CHARGING ARRANGEMENT, AND OPERATING METHOD

(71) Applicant: AUDI AG, Ingolstadt (DE)

(72) Inventor: Martin Dehm, Rennertshofen (DE)

(73) Assignee: AUDI AG, Ingolstadt (DE)

( * ) Notice: Subject to any disclaimer, the term of this patent is extended or adjusted under 35 U.S.C. 154(b) by 51 days.

(21) Appl. No.: 16/001,403

(22) Filed: Jun. 6, 2018

(65) Prior Publication Data

US 2018/0354377 A1   Dec. 13, 2018

(30) Foreign Application Priority Data

Jun. 8, 2017 (DE) .......... 10 2017 209 715

(51) Int. Cl.
*B60L 53/14* (2019.01)
*B60L 11/18* (2006.01)
(Continued)

(52) U.S. Cl.
CPC .......... *B60L 11/1816* (2013.01); *B60L 53/14* (2019.02); *B60L 53/16* (2019.02); *B60L 55/00* (2019.02); *H02J 7/0068* (2013.01)

(58) Field of Classification Search
CPC .......... B60L 53/14
(Continued)

(56) References Cited

U.S. PATENT DOCUMENTS

| 2012/0055724 A1 | 3/2012 | Iwasa et al. |
| 2014/0070767 A1* | 3/2014 | Morris ...................... B60L 5/42 320/109 |

(Continued)

FOREIGN PATENT DOCUMENTS

| DE | 11 2011 105 236 T5 | 2/2014 |
| EP | 0 768 744 A2 | 4/1997 |
| EP | 2 236 344 A2 | 10/2010 |

OTHER PUBLICATIONS

Examination Report dated Mar. 1, 2018 of corresponding German application No. 10 2017 209 715.9; 6 pgs.

*Primary Examiner* — Jerry D Robbins
(74) *Attorney, Agent, or Firm* — Maier & Maier, PLLC

(57) ABSTRACT

A charging device for a motor vehicle with a high-voltage battery, wherein the charging device includes a supply unit that is designed to supply a transmission voltage ($U_T$), and a connecting apparatus that is designed to connect the supply unit to the motor vehicle to charge the high-voltage battery, wherein the transmission voltage is a contact-safe transmission voltage ($U_T$). The motor vehicle includes a converter unit that converts a contact-safe transmission voltage ($U_T$) to a high-voltage charging voltage ($U_{HV}$) for charging the high-voltage battery. When a charging arrangement formed from the charging device and the motor vehicle is operated, the connecting apparatus is automatically connected to the connector device and the contact-safe transmission voltage ($U_T$) is converted to the high-voltage charging voltage ($U_{HV}$) in order to charge the high-voltage battery.

9 Claims, 1 Drawing Sheet

(51) Int. Cl.
*B60L 55/00* (2019.01)
*B60L 53/16* (2019.01)
*H02J 7/00* (2006.01)

(58) Field of Classification Search
USPC .......................................................... 320/109
See application file for complete search history.

(56) References Cited

U.S. PATENT DOCUMENTS

| | | | |
|---|---|---|---|
| 2015/0210174 A1* | 7/2015 | Settele | B60L 11/1816 320/109 |
| 2015/0258902 A1* | 9/2015 | Fietzek | B60L 11/1811 307/9.1 |
| 2017/0155266 A1* | 6/2017 | Namou | H02J 7/0057 |

* cited by examiner

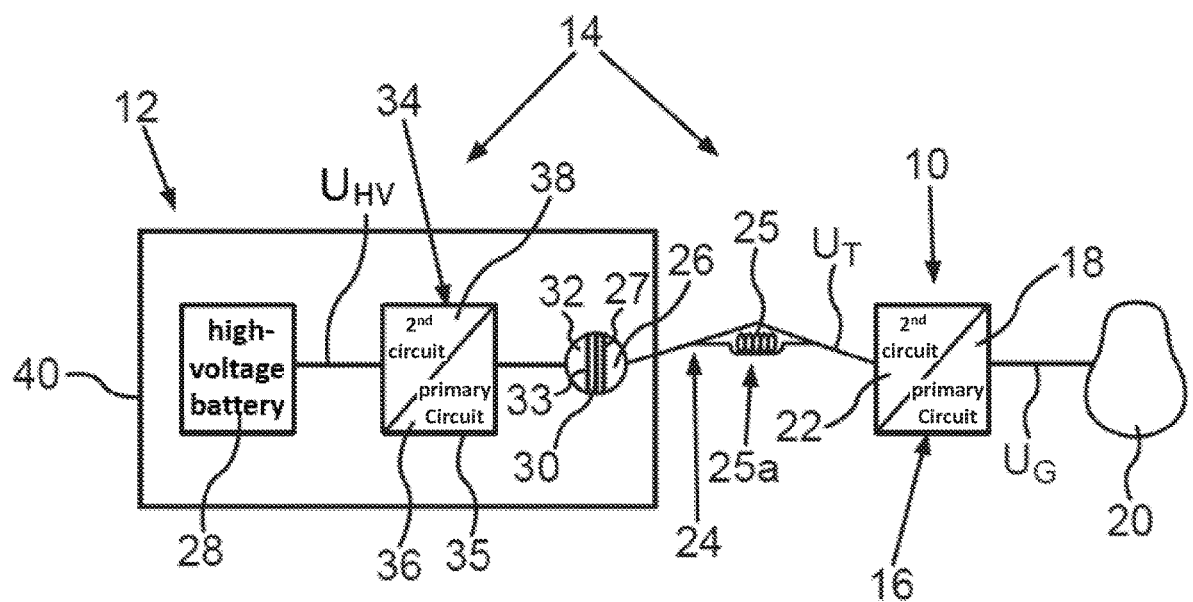

CHARGING DEVICE FOR A MOTOR VEHICLE, MOTOR VEHICLE, CHARGING ARRANGEMENT, AND OPERATING METHOD

BACKGROUND

The invention relates to a charging device for a motor vehicle with a high-voltage battery, wherein the charging device is designed optionally to charge or to discharge the high-voltage battery, and comprises a supply unit, which is designed to supply a transmission voltage, and a connecting apparatus, which is designed to connect the supply unit to the motor vehicle in order to optionally charge or to discharge the high-voltage battery. The invention further relates to a motor vehicle, a charging arrangement, and a method for operating the charging arrangement.

At present, there are numerous charging standards for cabled AC and DC charging:
- combined charging system CCS1 (Europe), CCS2 (NAR) (AC and DC charging)
- Chademo (only DC charging)
- China GB/T (AC and DC charging)
- type 1 AC charging (AC plug for NAR and Japan)
- type 2 AC charging (AC plug for Europe)

Furthermore, work is in progress on the standardization of cableless charging for automated charging. Alternative cabled automated charging systems are not gaining acceptance based on the contact danger and the plugging complexity. Besides safety and complexity, ideas such as the use of plugging robots, for example, are very complicated and therefore expensive.

In the field of utility vehicles, research is in progress on roof systems, for example, which are comparable to the current collectors of trains. On account of the high positioning of said roof systems, the danger posed to a standing user coming into contact with the pole declines.

A charging device mentioned in the introduction is known, for instance, from EP 2 236 344 A2. The charging device is designed in such a way that, in the case of the charging method for a vehicle, a handshake process is carried out after a charging plug has been plugged in. For the protection of an operator, the high charging voltage is applied only after a successful handshake.

Described in DE 11 2011 105 236 T5 is a vehicle that comprises a charging port which is supplied exclusively with low voltage (100 VAC).

A similar idea is known from US 2012/0 055 724 A1. The vehicle comprises a plurality of charging terminals, at least one of which is provided for a charging with low voltage (100 VAC or 200 VAC).

The systems described above are cabled charging systems and necessitate a plugging operation for the charging. These ideas in regard to cabled automated charging systems in the field of automobiles are critical to safety and/or are very complex. Wireless automated charging systems (for example, inductive systems) correspond to the current trend of automobile development. However, these systems are also complex and expensive. At present, a standardization of an automated charging system seems to be in sight solely for inductive charging (public or private charging). In addition to the known cabled and cableless systems, there is accordingly a need for an improved alternative, which offers more comfort, is less expensive, and is more efficient.

SUMMARY

The invention is based on the object of improving the above-mentioned charging systems, in particular in terms of complexity and safety.

In accordance with the invention, it is proposed that the transmission voltage is a contact-safe transmission voltage. The term "contact-safe" is understood here, in particular, in accordance with the standard IEC 60449. In accordance therewith, a low voltage is regarded as contact-safe when the following limit values are maintained: ≤50 V for alternating current voltage (AC) and ≤120 V for direct current voltage (DC).

The invention creates a charging device for a specified motor vehicle with a high-voltage battery, wherein the charging device has a supply unit that is designed to supply a transmission voltage, and a connecting apparatus that is designed to connect the supply unit to the specified motor vehicle in order to charge the high-voltage battery, wherein the transmission voltage is a contact-safe transmission voltage.

The contact-safe transmission voltage makes it possible to dispense with protective measures relating to danger to persons and, at the same time, to increase the safety of use. Consequently, the connecting apparatus, which, for example, comprises an automatic connecting apparatus, can be designed to be less complex. Through the simplified configuration of the connecting apparatus, it is also possible to achieve more simply an automation of the connection between the charging device and the motor vehicle. Accordingly, the charging device can also act as a technical enabler and contribute to a better proliferation of electric vehicles, which, in turn, is advantageous for environmental reasons. The charging and discharging function enables the high-voltage battery to serve as an intermediate storage unit. Thus, the charging device can charge the high-voltage battery when, for example, an excess of charging current is present. As needed, energy can be taken from the high-voltage battery in order to supply additional devices or to feed energy into the (general or home) electric power grid.

It is preferred that the contact-safe transmission voltage is a direct current voltage, which is at most 60 V and, in particular, at most 48 V. Alternatively, it is preferred that the contact-safe transmission voltage is an alternating current voltage, which is at most 30 V and, in particular, at most 25 V. With the transmission voltages proposed here, it is possible, in an especially good manner, to combine a higher efficiency of the charging device during the transmission of electric energy with a lesser danger for the user.

It is preferred that the supply unit has a primary circuit, to which an electric power grid can be connected, and a secondary circuit that is galvanically isolated from the primary circuit, in which the transmission voltage is applied. Through the galvanic isolation in the supply unit, different potentials between the electric power grid and the motor vehicle are not of relevance.

It is preferred that the connecting apparatus is designed as an automatic connecting apparatus that automatically connects the supply unit for charging the high-voltage battery to the motor vehicle. It is preferred that the connecting apparatus comprises a connecting element for automatic formation of an electrical connection to the motor vehicle, in particular to a connector device of the motor vehicle, in order to charge the high-voltage battery. The connecting apparatus can automatically execute the connecting operation between the motor vehicle and the charging device, without any user intervention having to occur. Accordingly, the safety of use of the system can be increased, while at the same time, there is an essentially similar complexity. For example, the connecting apparatus is arranged at a parking space in such a way that the connecting element can be brought in contact with the proper point of the vehicle by way of the force-generating element.

It is preferred that the connecting apparatus has a force-generating element, which, in particular, is provided at the connecting element, in order to generate a holding force, which detachably fastens the connecting element to the motor vehicle and, in particular, to a connector device of the motor vehicle. Preferably, the force-generating element comprises at least one magnetic element, such as, for instance, a magnet, and/or at least one elastic element, such as, for instance, a spring. The holding force can hold the connecting element to the connector device of the motor vehicle. The connection can be formed in that the magnetic element pulls the connecting element to the connector device. The release of the connection occurs simply by overcoming the holding force, for instance, by moving the motor vehicle. In a variant, the elastic element presses the connecting element in the direction of the connector device. The connection can then be made through suitable positioning of the motor vehicle. In all variants, the user no longer produces the connection between the motor vehicle and the charging device. Accordingly, comfort can be increased and the safety of use can be further improved.

Preferably, the charging device comprises a converter unit, which, in particular, can be provided in or on a motor vehicle and which is designed to convert a contact-safe transmission voltage to a high-voltage charging voltage for charging the high-voltage battery. It is preferred that the converter unit is further designed to convert a high-voltage charging voltage for charging the high-voltage battery to a contact-safe transmission voltage. The converter unit permits only safe voltages to be applied in the region that is accessible to the user, so that it is possible, in turn, to dispense with protective measures relating to danger to persons.

It is preferred that the converter unit is designed as a direct current voltage-direct current voltage converter. The direct current voltage makes possible a higher transmission voltage, so that a better efficiency and/or a faster charging can be achieved with an increased safety of use.

It is preferred that the converter unit has a primary circuit for a transmission voltage and a secondary circuit, which is not galvanically isolated from the primary circuit and to which the high-voltage battery can be connected. In particular, the galvanic isolation in the vehicle can be dispensed with when a galvanic isolation is already provided for the charging device.

The invention further creates a motor vehicle with a high-voltage battery, having a connector device for connecting the motor vehicle to a connecting apparatus in order to charge the high-voltage battery, and having a converter unit, which is designed to convert a contact-safe transmission voltage to a high-voltage charging voltage for charging the high-voltage battery. The converter unit makes it possible to only apply safe voltages in the region that is accessible to the user, so that, in turn, it is possible to dispense with protective measures relating to danger to persons.

The invention further creates a charging arrangement with an above-described preferred charging device and with an above-mentioned preferred motor vehicle, wherein the connecting apparatus is connected to the connector device, so that the transmission voltage can be converted to the high-voltage charging voltage in order to charge the high-voltage battery.

The invention creates, in addition, a method for operating an above-described charging arrangement for which the connecting apparatus is automatically connected to the connector device and for which the contact-safe transmission voltage is converted to the high-voltage charging voltage in order to charge the high-voltage battery.

The invention also includes further developments of the motor vehicle according to the invention and of the method according to the invention that have features such as already described in connection with the further developments of the charging device according to the invention. For this reason, the corresponding further developments of the method according to the invention are not described here once again.

By use of the charging arrangement according to the invention, the motor vehicle according to the invention, and the method according to the invention, it is possible respectively to realize similar advantages to those already described.

Described below are exemplary embodiments of the invention. For this purpose, the sole FIGURE schematically shows a charging arrangement.

In the exemplary embodiments explained below, what is involved are preferred embodiments of the invention. In the exemplary embodiments, the described components each respectively represent individual features of the invention that are to be regarded as being independent of one another and each of which the invention further develops also independently of one another and, accordingly, are to regarded, also individually or in a combination different from that shown, as belonging to the invention. Furthermore, the described embodiments can also be supplemented by additional features of the invention to those already described.

BRIEF DESCRIPTION OF THE DRAWING

In FIG. 1, functionally equivalent elements are each furnished with the same reference symbols.

FIG. 1 schematically shows a charging device 10 and a motor vehicle 12, which are part of a charging arrangement 14.

DETAILED DESCRIPTION

The charging device 10 comprises a supply unit 16, which is designed for supplying a transmission voltage $U_T$. A primary circuit 18 of the supply unit 16 is connected to an electric power grid 20, which, as line voltage $U_G$, supplies an alternating current voltage of 230 V, for example. The transmission voltage $U_T$ is output in a secondary circuit 22. In this example, the primary circuit 18 and the secondary circuit 22 are galvanically isolated from each other. In a modification, however, the galvanic isolation can be dispensed with in a way that is known in and of itself.

In this example, the supply unit 16 supplies a transmission voltage $U_T$, which is a direct current voltage of 48 V. It should be noted that the transmission voltage $U_T$ can also be set differently as long as a contact-safe voltage is provided. The transmission voltage $U_T$ can also be an alternating current voltage.

The charging device 10 further comprises an automatic connecting apparatus 24, which is known in and of itself. The connecting apparatus 24 is connected to the secondary circuit 22 and has a connecting element 26 in order to electrically connect the charging device 10 automatically to the motor vehicle 12. In this example, the connecting element 26 has at least one magnetic element 27, which can generate a holding force in order to detachably fasten the connecting element 26 to the motor vehicle 12. The connecting element 26 can be provided, for example, at a (collapsible) connection arm 25 of the connecting apparatus 24. The connection arm 25 can have an elastic element 25a, which is provided in such a way that a force directed at the motor vehicle 12 is exerted when the connecting element 26 is in contact with the motor vehicle 12.

The motor vehicle 12 comprises a high-voltage battery 28, which is charged with a high-voltage charging voltage $U_{HV}$. The high-voltage charging voltage $U_{HV}$ is greater than the transmission voltage $U_T$ and, therefore, as a rule, is not a contact-safe voltage.

The motor vehicle 12 comprises a connector device 30, with which the connecting apparatus 24 can be engaged in order to transfer electric energy from the charging device 10 to the motor vehicle 12. The connector device 30 has, for example, a connecting means 32, which has a design complementary to the connecting element 26 and with which the connecting element 26 can be brought into contact automatically through the automatic connecting apparatus 24. If, for instance, the connecting element 26 has the magnetic element 27, then the connecting means 32 has a complementary metal part 33. The connector device 30 is arranged, for example, at the front end, preferably at the radiator grill, or at the back end of the motor vehicle 12. Also conceivable is the provision of a plurality of connector devices 30. The connector device 30 can also be arranged at any other places of the motor vehicle 12, such as, for example, on the (under) body.

A converter unit 34, which, for example, is designed as a direct current voltage-direct current voltage converter (DC-DC converter) 35 and provided in the motor vehicle 12 to convert the lower contact-safe transmission voltage $U_T$ to the higher high-voltage charging voltage $U_{HV}$. The connector device 30 is electrically connected to the converter unit 34. Stated more precisely, the connector device 30 is connected to a primary circuit 36 of the converter unit 34. A secondary circuit 38 of the converter unit 34 is connected to the high-voltage battery 28. In contrast to the primary circuit 18 and the secondary circuit 22 of the supply unit 16, the primary circuit 36 and the secondary circuit 38 can be executed optionally as not galvanically isolated.

Overall, the high-voltage battery 28, the connector device 30, the converter unit 34, and a region of the connecting apparatus 24 in which the plug connector 26 is also contained are accordingly provided in a protective low-voltage region 40.

The functional operation of the charging arrangement 14 will be explained in detail below. The charging device 10 is connected to the electric power grid 20 and converts the line voltage $U_G$ to the contact-safe transmission voltage $U_T$ by means of the supply unit 16. The transmission voltage $U_T$ is transmitted to the motor vehicle 12 by means of the automatic connecting apparatus 24 and conveyed from the connector device 30 to the converter unit 34. The converter unit 34 converts the transmission voltage $U_T$ to the high-voltage charging voltage $U_{HV}$, with which the high-voltage battery 28 can be charged.

The automatic connection can therefore result since the connector device 30 faces the connecting apparatus 24. The motor vehicle 12 is then moved in such a way that the distance between the connector device 30 and the connecting apparatus 24 is diminished. In the present example, when the distance drops below a certain threshold, the connecting element 26 is pulled toward the connecting means 32 or vice versa. The electrical connection is formed in a way that is known in and of itself, for example, by means of contact pins that are complementary to one another. The holding force is adequate to fasten the connecting element 26 and the connecting means 32 reliably to each other during a charging operation or discharging operation. For improving or safeguarding the electrical connection, the elastic element 25a presses the connecting arm 25 and thus the connecting element 26 onto the connector device 32.

For automatic release of the connection in this embodiment, it suffices to move the motor vehicle 12 away from the charging device 10 until the holding force of the connecting apparatus 24 is overcome. In this way, the connection between the charging device 10 and the motor vehicle 12 can be released.

In one variant, it is possible to provide contact pins at the connector device 30, which are spring-mounted, if appropriate, and can be brought into contact with corresponding contact surfaces of the connecting apparatus 26 by correspondingly moving the motor vehicle 12. The opposite configuration of contact pins and contact surfaces is also possible. In this case, the holding force can likewise be generated, as described above, by the elastic element 25a. Through the spring mounting of the contact pins, it is possible to augment the holding force, so that an even more reliable electrical connection can be formed.

Overall, the examples show how, through the invention, the two central problems posed as to why cabled automated charging can hardly be pursued at present, namely, safety and complexity, can be improved.

Presented as a solution is an (automated) cabled charging of HV electric vehicles (plug-in vehicle or E-vehicle) with (automated) connecting operation, as described above, using maximally allowed contact voltages in AC and DC (for example, for 48 V in the case of direct current voltage). Alternatively or additionally, it is also possible to use a conventional plug connector.

Through the use of a galvanically isolated supply unit in the form of, for example, a wall box in the garage, it is possible to dispense with the galvanic isolation in the vehicle. The voltage for supplying the vehicle is limited to 48 V, for example, when direct current voltage is used. Protective measures relating to danger to persons can thereby be dispensed with. The complexity of the plug connector can therefore be reduced markedly. In the vehicle, the transmission voltage is subsequently adjusted through a non-galvanically isolated direct current voltage converter (DC to DC converter) to the HV battery voltage.

The invention claimed is:

1. A charging device for a specified motor vehicle with a high-voltage battery, wherein the charging device is designed optionally to charge or to discharge the high-voltage battery, and comprises a supply unit that is designed to supply a transmission voltage ($U_T$), and has a connecting apparatus that is designed to connect the supply unit to a connector device of the specified motor vehicle, in order to optionally to charge or to discharge the high-voltage battery,
hereby wherein the transmission voltage is a contact-safe transmission voltage ($U_T$);
wherein the motor vehicle comprises a converter unit, which is designed to convert the contact-safe transmission voltage ($U_T$) to a high-voltage charging voltage ($U_{HV}$) for charging the high-voltage battery,
wherein the connecting apparatus comprises a connecting element for the automatic formation of an electrical connection to the connector device in order to charge the high-voltage battery,
wherein the high-voltage battery, the converter unit, the connector device, and a region of the connecting apparatus containing the connecting element are provided in a protective low-voltage region, wherein the connecting apparatus is arranged at a parking space, and the connecting element is brought in contact with a predetermined point of the specified motor vehicle when the vehicle is moved into the parking space, and wherein the connecting element includes at least one elastic element so that a force directed at the specified motor vehicle is exerted to the at least one elastic element when the connecting element is in contact with the specified motor vehicle.

2. The charging device according to claim 1, wherein the contact-safe transmission voltage ($U_T$) is a direct current voltage, which is at most 60 V and, in particular, at most 48 V, or in that the contact-safe transmission voltage ($U_T$) is an alternating current voltage, which is at most 30 V and, in particular, at most 25 V.

3. The charging device according to claim 1, wherein the supply unit has a primary circuit that can be connected to an electric power grid, and to a secondary circuit that is galvanically isolated from the primary circuit and in which the transmission voltage ($U_T$) is applied.

4. The charging device according to claim 1, wherein connecting apparatus is designed as automatic connecting apparatus that connects the supply unit automatically to the specified motor vehicle optionally for charging or for discharging the high-voltage battery.

5. A motor vehicle having a high-voltage battery, with a connector device for connecting the motor vehicle to a connecting apparatus in order to optionally charge or discharge the high-voltage battery, wherein a converter unit, which is designed to convert a contact-safe transmission voltage ($U_T$) to a high-voltage charging voltage ($U_{HV}$) for charging the high-voltage battery, wherein the connecting apparatus comprises a connecting element for the automatic formation of an electrical connection to the connector device in order to charge the high-voltage battery, wherein the high-voltage battery, the converter unit, the connector device, and a region of the connecting apparatus containing the connecting element are provided in a protective low-voltage region, wherein the connecting apparatus is arranged at a parking space, and the connecting element is brought in contact with a predetermined point of the specified motor vehicle when the vehicle is moved into the parking space, and wherein the connecting element includes at least one elastic element so that a force directed at the specified motor vehicle is exerted to the at least one elastic element when the connecting element is in contact with the specified motor vehicle.

6. The motor vehicle according to claim 5, wherein the converter unit is designed as a direct current voltage and a direct current voltage converter.

7. The motor vehicle according to claim 5, wherein the converter unit has a primary circuit for a transmission voltage ($U_T$) and a secondary circuit that is not galvanically isolated from the primary circuit and can be connected to the high-voltage battery.

8. A charging arrangement with a charging device according to claim 5, wherein the connecting apparatus is connected to the connector device, so that the transmission voltage ($U_T$) can be converted to the high-voltage charging voltage ($U_{HV}$) in order to charge the high-voltage battery.

9. A method for operating a charging arrangement according to claim 8, in which the connecting apparatus is automatically connected to the connector device, and in which the contact-safe transmission voltage ($U_T$) is converted to the high-voltage charging voltage ($U_{HV}$) in order to charge the high-voltage battery.

* * * * *